United States Patent [19]
Wainer

[11] 3,889,039
[45] June 10, 1975

[54] NUCLEATION AND ORIENTATION OF LINEAR POLYMERS

[75] Inventor: Eugene Wainer, Shaker Heights, Ohio

[73] Assignee: Horizons Incorporated, Cleveland, Ohio

[22] Filed: Apr. 26, 1973

[21] Appl. No.: 354,594

[52] U.S. Cl............ 428/404; 252/62.54; 260/40 R; 260/DIG. 35; 264/108; 428/331; 428/443; 428/446; 428/458; 428/469; 428/900; 428/910
[51] Int. Cl. ........ B32b 5/16; H01f 1/11; H01f 1/30
[58] Field of Search .......... 161/168, 231, 402, 411, 161/162, 205, 225, 214, 206; 252/62.54, 252/62.55; 260/40 R, DIG. 35

[56] References Cited
UNITED STATES PATENTS

| | | | |
|---|---|---|---|
| 2,400,099 | 5/1946 | Brubaker | 252/62.54 |
| 2,999,275 | 9/1961 | Blume | 252/62.54 |
| 3,024,392 | 3/1962 | Baermann | 264/108 |
| 3,051,988 | 9/1962 | Baermann | 264/22 |
| 3,070,841 | 1/1963 | Schornstheimer | 252/62.54 |
| 3,359,152 | 12/1967 | Blume | 161/168 |
| 3,515,625 | 6/1970 | Sedlak | 161/160 |
| 3,673,139 | 6/1972 | Hrach | 260/40 R |

FOREIGN PATENTS OR APPLICATIONS

| | | |
|---|---|---|
| 1,284,531 | 12/1968 | Germany ........................ 252/62.54 |
| 781,128 | 8/1957 | United Kingdom.............. 252/62.54 |
| 1,104,089 | 2/1968 | United Kingdom |
| 1,102,844 | 2/1968 | United Kingdom |

Primary Examiner—George F. Lesmes
Assistant Examiner—Ellis P. Robinson
Attorney, Agent, or Firm—Lawrence I. Field

[57] ABSTRACT

Additions of small amounts of fine particle size specialized monoclinic inorganic crystals to otherwise relatively pure polyalkylene terephthalate molding compounds increases the rate and extent of crystallization and the specific gravity of the polyalkylene terephthalate molded part. Both low and high molecular weight polyalkylene terephthalates are improved with regard to physical properties and dimensional stability through addition of these small quantities of these specialized monoclinic materials. Under controlled conditions of injection and forming, anisotropic properties may be obtained as a consequence of the effect and extent of the crystallization of the polyalkylene terephthalates which has been promoted by these strongly active nucleating agents.

In addition to the improvement of the physical properties of the molded article, the use of these specialized nucleating agents in suitable particle size yields a significant shortening of the retention time of the injection molded material in the mold, this being an item of economic significance.

An important aspect of the invention is the added capability of polyalkylene terephthalate crystal orientation by controlled application of magnetic forces to these nucleated compositions, and particularly (a) when such nucleating agents are ferromagnetic in themselves and (b) whether ferromagnetic or not, the preferred nucleating agents are more forcibly aligned into a desired direction (thus promoting crystallization of the polyalkylene terephthalate also in the desired direction) by the action of magnetic fields of force applied to the composition in the molding cycle in the presence of sweeping agents of fibrous and/or acicular nature taken from the class of non-metallic and/or metallic ferromagnetic materials.

Not only are the specialized monoclinic nucleating agents useful for promoting crystallization of polyalkylene terephthalates when such nucleating agents are useful in small percentage, but in much larger percentages they can be used as mineral fillers to yield high strength, dimensionally stable, clean surface parts obtained with a molding cycle time of short duration.

17 Claims, 9 Drawing Figures

3,889,039

PATENTED JUN 10 1975 3,889,039

SHEET 2

NUCLEATION AND ORIENTATION OF LINEAR POLYMERS

BACKGROUND

This invention relates to the improvement of synthetic resins and particularly to the improvement in physical properties of both homopolymers such as polyalkylene (e.g. polyethylene) terephthalates, polyolefins, polyamides, polymethylmethacrylates, polysulfones, polyvinyl resins such as PVC and polystyrenes and copolymers such as the ABS family of plastic materials of which acrylonitrile-butadiene-styrene is a typical member and the thermoplastic elastomers, such as the styrene-butadiene or styrene-isoprene copolymers, this improvement resulting from the incorporation of a specialized class of inorganic crystalline materials as nucleating agents, into the polymer and the shaping of the polymer by extrusion or injection molding or other suitable techniques.

The properties and molding may be further improved by the addition of specialized materials which influence the crystallization of the polymer in a desired manner.

The use of nucleating agents to modify the crystalline structure of crystallizable polymers is known and is described in U.S. Pat. No. 3,367,926 (Vocks), U.S. Pat. No. 3,585,264 (Thomas) and in British Specifications Nos. 1,104,089 and 1,102,844 (both AKU) and elsewhere in the published literature. It has been found that the use of such agents is often unsatisfactory, especially when they are incorporated in polyalkylene terephthalates such as polyethylene terephthalates.

It has been further found that only when the nucleating agent is an inorganic crystalline nucleating agent with specific properties, is the desired improvement insured.

OBJECTS OF THE INVENTION

It is a first object of this invention to provide crystalline nucleating agents of specialized form and unit dimensions for rapid initiation, catalysis and rapid growth of the crystallization of the polyalkylene terephthalates taken from the class of polymethylene, polyethylene, polybutylene and polypropylene polyalkylene terephthalates with special attention to the polyethylene terephthalates.

It is a second object of the invention to provide, among these nucleating agents, a type of agent which can be oriented in the desired direction by outside forces so that nucleated and catalyzed crystal growth of the base polymer can be caused to take place in a controlled direction for ensuring the maximum desired strength.

It is a third object of this invention to provide additional orienting agents which may more properly be called "sweeping agents" to the nucleating agents which will facilitate the orientation of the nucleating agents and the attendant crystalline growth of the polyalkylene terephthalate in a shorter space of time and with more certainty than if dependence is made totally on the effect of these outside forces on the nucleating agents themselves.

It is a fourth object of this invention to use a combination of the nucleating agents for accelerating the crystal growth of the polyalkylene terephthalates, the "sweeping agents," fibrous fillers which are known to add to the strength of formed thermoplastics, such fibrous fillers being in chopped form, adding an outside force of such strength so that the combination of reagents not only cause the crystal growth of the polymer to take place in a desired direction but at the same time orient the fibrous fillers in an identical direction.

It is a fifth object of this invention to permit the polyalkylene terephthalates, and particularly the polyethylene terephthalates, to be molded, nucleated and oriented in temperature ranges extending from as low as 100° up to 250° F. (38° to 121° C.) while still retaining the fully obtainable strength of the molded part, irrespective of molding temperature, through a combination of addition of outside orienting forces in the molding cycle with or without subsequent annealing at temperatures well below the glass transition temperature.

It is a sixth object of this invention to produce continuously extruded sheets, films or foils in any desired orientation without the need for monaxial or biaxial stretching and still achieve the type of crystal growth and orientation which yields strength in ranges equivalent to that available from stretching through the medium of a combination of nucleation, with or without sweeping agents in which such orientation is accomplished by the application of an outside force.

It is a seventh object of this invention, in the absence of the nucleating agents described for the polyalkylene terephthalate, to orient deliberately added fibrous reinforcing agents in relatively short length in any desired direction by use of a combination of the aforementioned "sweeping agents" plus high strength, short fibers commonly utilized for the reinforcement of engineering plastics. The engineering plastics include the polyalkylene terephthalates defined above and at least the following: (1) the ABS family of plastic materials of which acrylonitrile-butadiene-styrene is a typical member; (2) polyethylenes; (3) polypropylenes; (4) polycarbonates; (5) polyamides; (6) thermoplastic elastomers, such as the styrene-butadiene or styrene-isoprene copolymers; (7) polyvinyl halides; and (8) polysulfones.

It is an eighth object of this invention to provide molds for injection molding procedures which make possible the application of outside forces in which the body of the mold is made of a non-magnetic metal and space is provided in such molds for the insertion of magnetic materials to permit the application of magnetic forces to the mold and its contents in a predetermined and desired direction.

It is a ninth object of this invention to provide devices in followon equipment utilized for the extrusion of film and sheet which position magnetic forces in a desired direction in order to achieve orientation of crystallization in such film not only in the case where nucleating agents are present but also where such nucleating agents are absent but magnetizable sweeping agents and reinforcement materials are present which materials may be lined up in a desired direction for the achievement of maximum strength.

It is a further object of this invention to provide controllable means for a desired directional reinforcement of thermoplastic materials by application of mangetic forces to obtain the best advantage of such directional reinforcment, whether such reinforcement is nucleated or non-nucleated for crystal growth of the thermoplastic itself through use of magnetizable fibrous reinforcement materials added to the composition.

Finally, in the case of the polyalkylene terephthalates, it is an object of this invention to provide these specialized nucleating agents to the composition in sufficiently high concentration so that with or without application of outside forces, they may act as nucleating mineral fillers to yield high strength and mechanical properties, ease of molding, superior surface finish in simplified molds without the need for addition of the fibrous reinforcement materials normally used for these purposes.

These and other objects will become apprent from the description which follows taken in conjunction with the drawings forming a part of this specification, in which.

Figure 1:
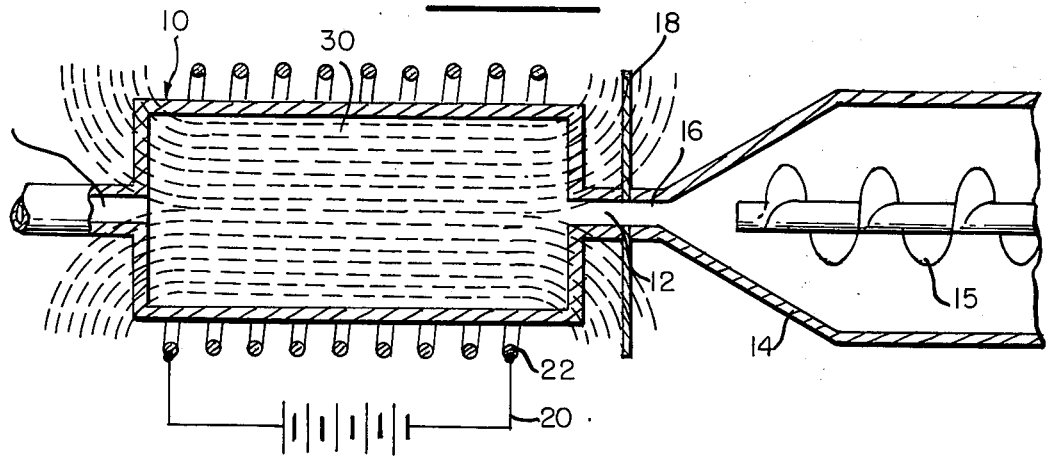
FIG. 1 is a longitudial view, partly in section, of one form of apparatus for accomlishing the present invention.

FIG. 1 is a view similar to the views in U.S. Pat. No. 2,849,312 issued Aug. 26, 1958. As shown in the Figure, the apparatus comprises a mold 10 the walls of which define a hollow cylinder, or any other appropriate shape. The mold is provided with an inlet nozzle 12 and an outlet orifice 13 through which excess mold contents are discharged in the event of overfilling. Means to fill the mold are shown as an extrusion die 14, provided with a screw 15 for forcing a mixture of polymer and selected additives through a port 16 which matches the inlet opening 12 of the mold 10. Means 18 are provided for bringing the extrusion device into cooperation with the filling opening 12. Mold 10 is made of either non-magnetic material or of an alloy covered with an electrically insulating layer.

Means for creating a magnetic field of suitable strength and intensity for the mold and its contents, such means comprising a source of potential 20 connected to an induction coil 22, disposed about mold 10. The coil 22 is constructed in a manner which permits the mold to open along a longitudinal axis for rapid removal of the molded part. This electrical coil contains in each turn an automatic connect-disconnect mechanism so the coil may be opened at right angles to the direction of winding on demand, such connect-disconnect mechanism being readily available as state of the art components, thus permitting easy separation of the mold from the coil.

The magnetic lines of force are shown schematically as the broken lines 30.

Figure 2:
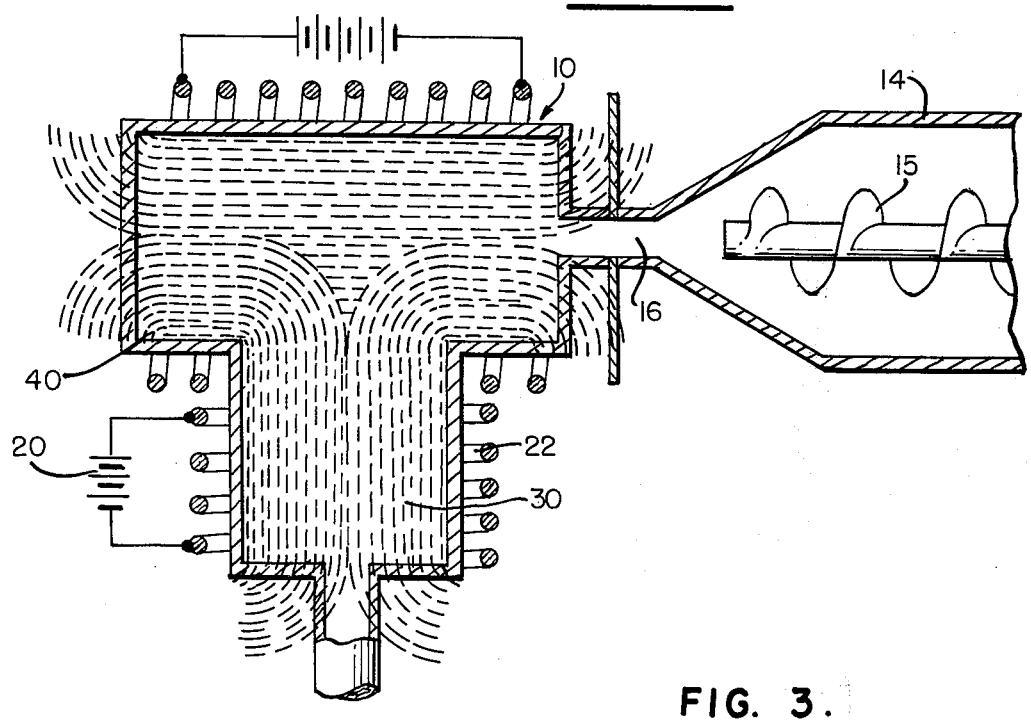
FIG. 2 is a view similar to FIG. 1 or a modification thereof.

FIG. 2 is a modification of FIG. 1 showing one manner in which these magnetic lines of force may be controlled. The magnetic fields shown ameliorate stresses inherent for example, in the region of 40 where the two arms of the T intersect.

Figure 3:
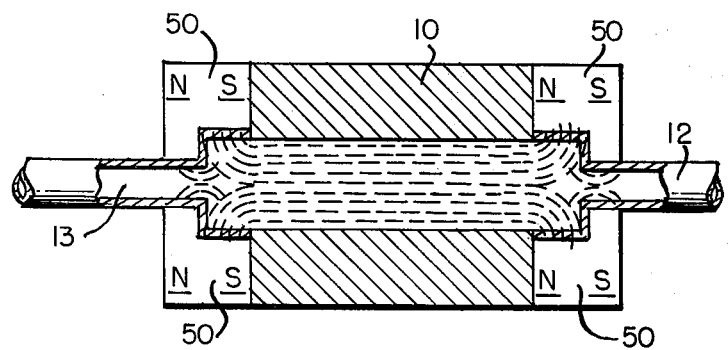
FIGS. 3 and 4 are longitudinal views in section showing an alternative means for obtaining desired magnetic fields in the apparatus.
Figure 4:
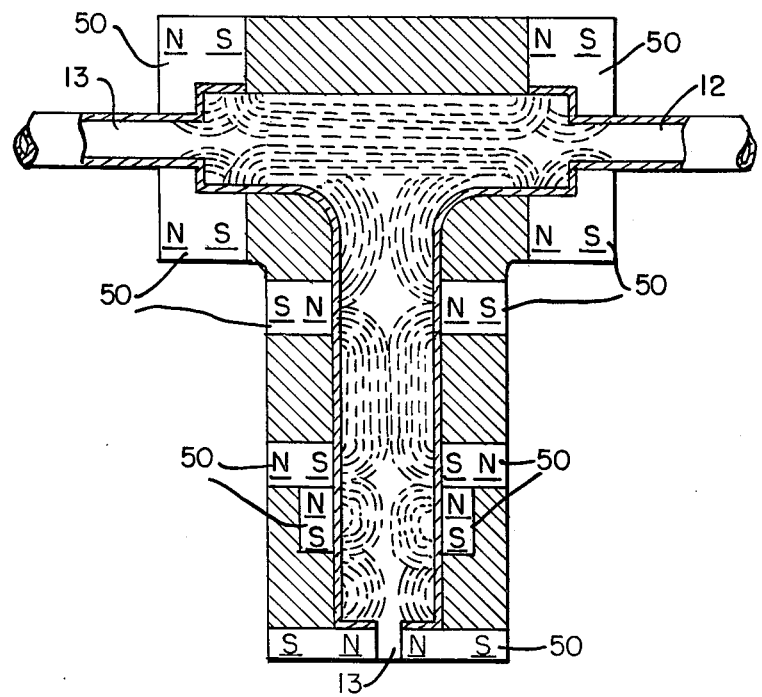

FIGS. 3 and 4 illustrate the placing of permanent magnets 50 as inserts at appropriate places in the mold wall. The use of the permanent magnets exhibits an advantage over the use of an energized electrical coil in that a non-magnetic metal can be utilized for the mold components and no need for an insulating material such as a ceramic coating or ceramic body is then required. As may be seen from the figures substantially any direction of lines of magnetic lines of force can be obtained by suitable positioning of such permanent magnetic inserts. It will be readily apparent that the number, strength and arrangement of such inserts may be varied according to the magnetic field which is desired.

Figure 5:
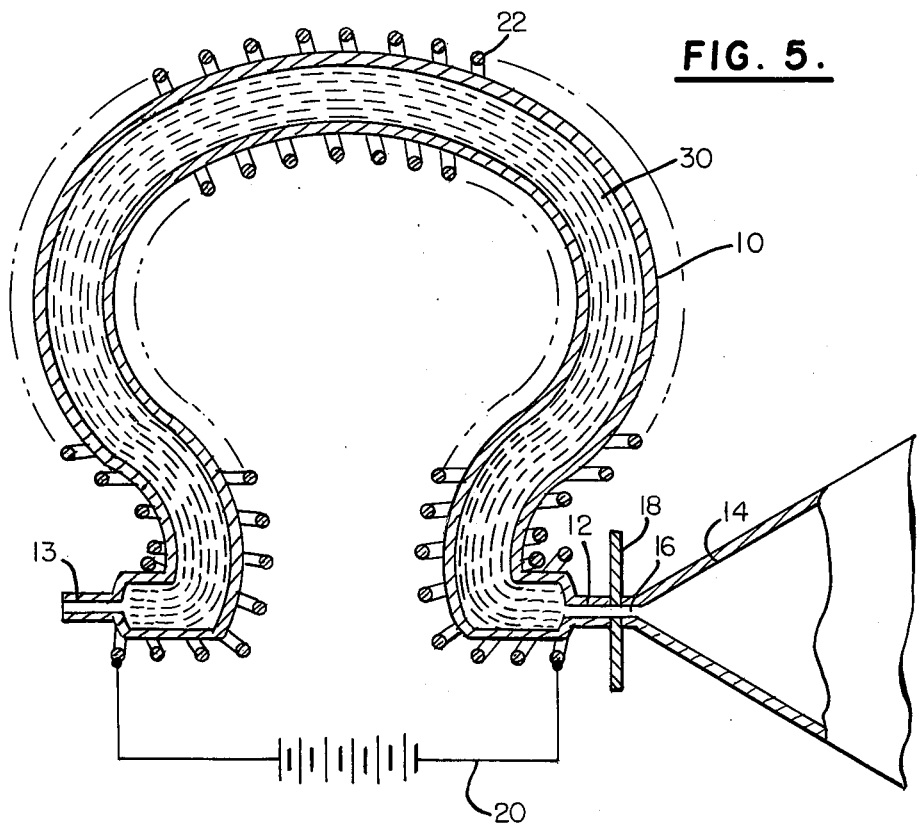
FIG. 5 is a view of an apparatus for forming a tubular product such as an automobile tire.
Figure 6:
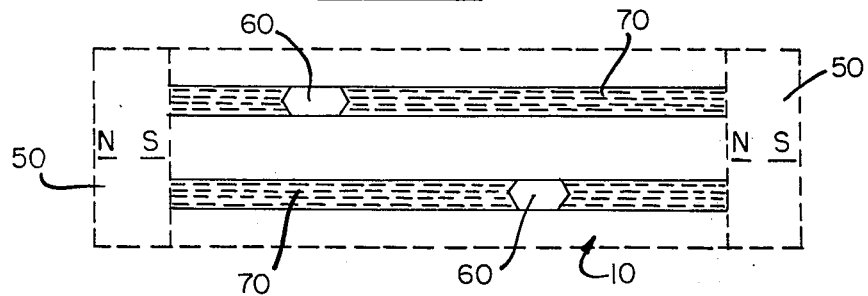
FIGS. 6, 7, 8 and 9 are schematic views intended to illustrate the orientation of the several contituents in the finished product.
Figure 7:
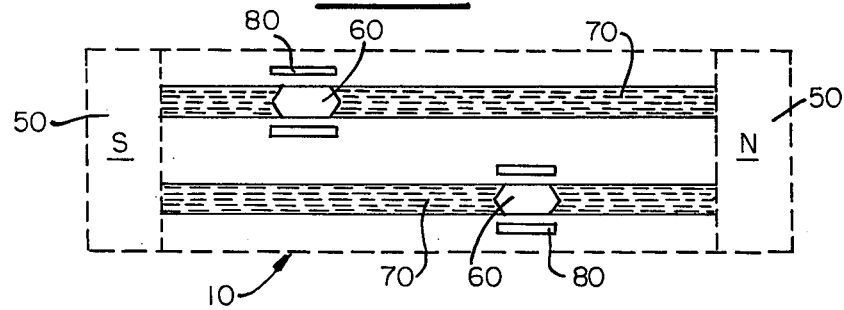
Figure 8:
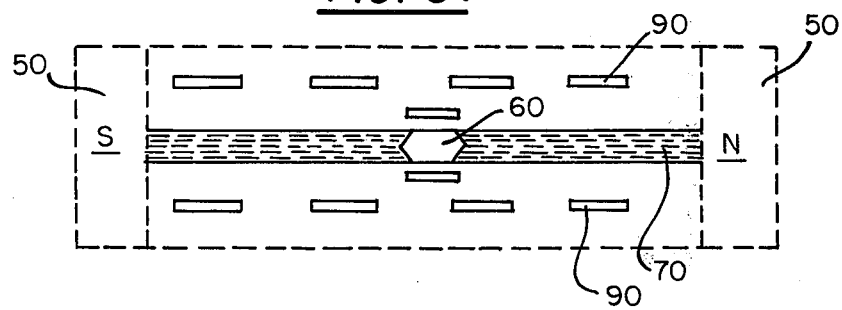

FIG. 5 is a depiction of a magnetized mold defining the cross section of a tubulature such as an automobile tire. It is seen that the lines of force shown in FIG. 5 are at right angles to the direction which the tire moves when in use, this being the desired condition which can be utilized for orientation in the manner described in this invention for obtaining maximum reinforcement in a manner effectively identical with the direction of reinforcement used for the now well known radial ply tire. The numbers used for defining various parts of FIG. 5 are identical with those used in the previous figures. The embodiment shown in FIG. 5 can be modified by the placement of permanent magnets in the same manner as in FIGS. 3 and 4.

Figure 9:
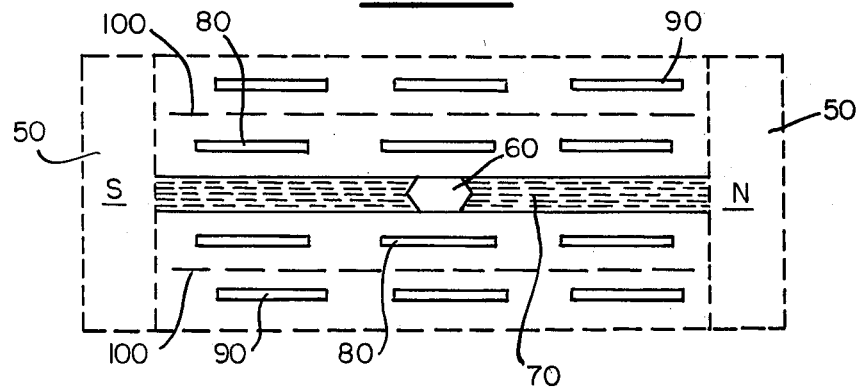

FIGS. 6, 7, 8 and 9 show a grossly distorted picture of the structure of the engineering thermoplastic which contains therein, in various configurations, the nucleating agents 60, the oriented polymer crystals 70 grown in a preferred direction as a result of the orientation of the nucleating agents, the sweeping agents 80 of non-metallic material which aid in the orientation of the desired nucleating agents, the combination of magnetic metallic reinforcing orientation 90, sweeping agents 80, and nucleating agents 60 which make the desired orientation of the nucleating agents and its attendent orientation and growth of the polymer crystal itself a more positive action whether the nucleating agent exhibits ferromagnetic properties or not. FIG. 9 not only defines a situation where both the nucleating agents and the polymer crystal which grow therefrom can be oriented in a desired direction but also defines the significant advantage of added reinforcement exclusive of the orientation of the polymer crystal by virtue of using a combination of magnetic fibers 100 and non-magnetic fibers 100' in which such magnetic fibers are oriented in the proper direction as a function of the imposed magnetic field acting on fibrous magnetic materials which thus push or sweep the non-ferromagnetic fibers into a desired oriented position. This combination effect takes place whether nucleating agents are present or not, and also takes place whether such nucleating agents are magnetizable or not.

The magnetic lines of force in FIGS. 6 through 9 are applied in the directions indicated in these figures and define how nucleating agents may be oriented in a desired direction whether such nucleating agents are ferromagnetic or not.

From examination of FIGS. 2, 4 and 5, it is evident that the desired changes and directions of these lines of force, the growth of the polymer crystal and the direction of alignment of various fiber reinforcing agents can be made to occur in any desired direction through the controlled application of the magnetic field.

THE DESCRIPTION OF THE INVENTION

Each of the components of the invention will be described separately.

A. NUCLEATING AGENTS AND CRYSTAL GROWTH PROMOTERS FOR POLYALKYLENE TEREPHTHALATES

The crystal structure of a polymer (generally a function of its chemical makeup) usually defines whether the physical properties of the polymer can be enhanced by increasing the amount of crystallinity in such polymers by mechanical orientation and/or by accelerating the growth of crystals during the processing. Usually the crystalline structure of the material can be defined approximately by measurement of its various cell dimensions, such as the length of the crystal axes and the angles which certain of these crystal planes defined by the crystal axes make with each other. Crystalline polymers which exhibit at least one axis much longer than the other axes of the crystal are most susceptible to the improvement of their physical properties by an orientation process. Crystalline polymers falling in this class are generally triclinic or exhibit a closely associated morphology designated as monoclinic. These systems usually exhibit one cell dimension which is grossly different than the other two. In addition, the angles determined by the different lengths of the various crystal axes between each of the planes of the crystal are also usually substantially different from each other in the monoclinic-triclinic system.

The polyalkylene terephthalates and particularly polyethylene terephthalate fall in this category. As will be seen from Table 1, the length of the c axis in polyethylene terephthalate is approximately twice that of the $a$ and $b$ axis, whereas the beta angle in this essentially triclinic crystal is larger than either the alpha or gamma angles of the crystal. The monoclinic and triclinic crystallographic systems are closely related to each other and are sometimes indistinguishable from each other. The monoclinic system includes all forms containing three unequal axes, having one of their axial inclinations oblique. Triclinic systems include all forms containing three unequal axes in which all intersections are oblique. The vertical axes in both systems is generally designated as the $c$-axis. In both crystal systems, the angle between the axes $a$ and $c$ is represented by the word beta. In both systems the relative length of the axes $a$ and $b$ may be either the same or different but invariably in both systems the length of axis $c$ is greater than that of either $a$ or $b$. While this type of non-uniform crystalline structure is common to all of the polyalkylene terephthalates taken from the class of polymethylene, polyethylene, polypropylene and polybutylene terephthalates, the extension of the $c$-axis is most pronounced in polyethylene terephthalate. Thus, while orientation processes are most effective for the polyethylene terephthalate member of this class of polymers, similar effects are obtained with all of the other members, but to a lesser degree.

I have found that certain crystals in the monoclinic system showing certain similarities to the dimensions and angles of the polyalkylene terephthalates, and particularly polyethylene terephthalate, act not only as very powerful nucleators of crystalline growth in these polymers under preferred processing conditions, but in addition to very rapid initiation of crystal growth, they also accelerate equally rapidly the extent of the development of crystallinity in the polymer. As a generalized example and with identical methods of processing, the usual polyethylene terephthalate may show a degree of crystallinity substantially less than 20 percent. Such material exhibits a low tensile strength and an extreme elongation. When the crystallinity is increased into the range of 20 to 50 percent, the tensile strength is drastically increased, the degree of elongation is reduced and the physical properties generally are improved. In addition, the specific gravity of the polyethylene terephthalate is generally increased from a range normally of the order of 1.31 to 1.34 into a range of 1.39 to 1.44. When an otherwise identical sample of polyethylene terephthalate, irrespective of the source of the material, exhibiting this low specific gravity, low tensile strength and extreme elongation is processed in exactly the same manner except that it contains a small percentage of a suitable nucleating agent, crystallinity is extended into the 30 percent and higher range, the specific gravity is raised into the 1.39 to 1.45 range, the tensile strength is drastically increased and the elongation is reduced. Other physical properties, such as flexural strength and notch resistance are also improved.

I have found that nucleating agents taken from the monoclinic class of crystals exhibiting a $c$-axis within 10 percent of the length of the $c$-axis of the polyalkylene terephthalate, a beta angle within at least 20 percent of the beta angle exhibited by the polyalkylene terephthalate, and preferably one of the other axes within 20 percent of the length of either the $a$ or $b$-axis invariably act as powerful initiators of crystallization (i.e. nucleation) and additionally powerful promoters of extended crystallization of this class of polymers. This equivalence of cell dimension and cell angles appears to be a requirement for the material to act as a nucleator and promoter of crystalline growth in the polyalkylene terephthalate family of plastics and particularly the degree of concordance in dimension and angle also appears to be necessary as listed previously. As will be defined in later portions of this specification, this improvement in crystallinity is exhibited whether or not the material is mechanically deformed in a specific direction which is the usual procedure for orientation and improvement of crystallinity normally used in the absence of such nucleating agents.

Nucleating agents which meet the morphological and crystal dimension characteristics provided in the foregoing description are listed in Table 1 and all of these have been found to be effective for nucleation of crystallization and the propagation of crystalline growth. This propagation of crystalline growth takes place along the $c$-axis of the polyalkylene terephthalate.

Examination of crystals in the preferred particle size ranges which differ radically from the aforelisted requirements do not show any significant effect on either initiation of crystallization or propagation of the growth of crystallization beyond that which would normally be obtained through mechanical orientation. In some cases, these crystals outside of the described class, actually interfere not only with orientation but with the propagation of crystalline growth.

All of the nucleating agents listed in Table 1 occur naturally or may be made synthetically by either thermal or hydrothermal techniques, or combinations thereof, by presently known techniques.

TABLE 1

CRYSTAL DIMENSION CHARACTERISTIC - NUCLEATING AGENTS
FOR INITIATION AND CATALYSIS OF CRYSTALLIZATION OF
POLYALKYLENE TEREPHTHALATES

| No. | NAME | COMPOSITION | CELL AXES a | b | c | BETA - ANGLE |
|---|---|---|---|---|---|---|
| 1. | Polyethyleneterephthalate | — | 4.56 | 5.94 | 10.75 | 118° (alpha = 98.5°) (gamma = 112.0°) |
| 2. | Larnite | Beta - calcium - ortho silicate $\beta$ - $Ca_2SiO_4$ | 5.48 | 6.76 | 9.28 | 94.6° |
| 3. | Epidote | $Ca_3Al_{1.5}Fe_{1.0}(SiO_4)_3OH$ | 8.89 | 5.63 | 10.19 | 115.4° |
| 4. | Piedmontite | $Ca_3Al_{1.5}Fe_{1.5}(SiO_4)_3OH$ | 8.95 | 5.70 | 9.41 | 115.4° |
| 5. | Phlogopite | $KMg_3(AlSi_3O_{10})(OH)_2$ | 5.3 | 9.2 | 10.3 | 100.2° |
| 6. | Fluorophlogopite | $KMg_3(AlSi_3O_{10})F_2$ | 5.3 | 9.2 | 10.14 | 100.0° |
| 7. | Annite | $KFe_3(AlSi_3O_{10})(OH)_2$ | 5.4 | 9.4 | 10.30 | 100.0° |
| 8. | Ferri-annite | $KFe_3(FeSi_3O_{10})(OH)_2$ | 5.4 | 9.4 | 10.34 | 101.0° |
| 9. | Fluoro-annite | $KFe_3(AlSi_3O_{10})F_2$ | 5.4 | 9.4 | 10.21 | 99.7° |
| 10. | Fluoro-ferriannite | $KFe_3(FeSi_3O_{10})F_2$ | 5.4 | 9.4 | 10.30 | 100.2° |
| 11. | Clinohumite | $4 Mg_2SiO_4 Mg F_2$ | 13.68 | 4.75 | 10.27 | 100.8° |
| 12. | Clinozoisite | $Ca_2Al_3(SiO_4) OH$ | 8.89 | 5.58 | 10.14 | 115.9° |
| 13. | Mangano-Piedmontite | $Ca_3Al_{1.5}Mn_{1.5}(SiO_4)_3OH$ | 8.95 | 5.70 | 9.4 | 115.7° |

In all cases, the most effective particle size range for these kinds of crystals is between 0.1 and 3.0 microns. Known procedures are available for griding these materials into this particle size range with good efficiency. The amount of nucleating reagent utilized will generally fall into a range of 0.01 percent up to about 5 percent, unless the nucleating agent is used as a reinforcing mineral filler in which case weight percent additions up to 50 percent may be used. It is found that the finer the particle size range of the nucleating agent, the more effective the nucleating agent and the lower the percentages which need to be used. For example, if all of the nucleating agent 0.1 to 0.5 micron size range, an amount of nucleating agent in the range of 0.01 to 0.1 percent is sufficient to yield the maximum of crystallization available from its presence. If the nucleating material falls in a particle size range of between 0.5 and 1 micron, generally at least 0.5 percent of the nucleating agent is required to produce the maximum of crystallization, whereas if the nucleating material has the majority of its particle sizes in a range of 1 to 3 microns up to 3 percent and in a few cases up to 5 percent of the nucleating agent is required in order to yield the maximum benefit from its presence. As indicated, these ranges indicate the minimum weight percentages required for adequate nucleation. Much higher percentages are required for mineral filling.

In summary, and in order to define the effect of the presence of this relatively small quantity of nucleating agent on the crystalline content of the polyalkylene terephthalates and particularly polyethylene terephthalate which has been produced without any major degree of orientation due to mechanical stretching, such non-nucleated polymers will generally exhibit or contain less than 10 percent crystalline material and will usually exhibit a specific gravity in range of 1.30 to 1.34. With otherwise identical processing, the addition of the preferred nucleating agents described in Table 1 in the particle sizes and ranges given above as preferred will increase the crystallinity into the 30 percent range and higher, and will increase the specific gravity into a range of 1.39 to 1.48.

It is noted that many of the nucleating agents given in Table 1 contain iron and some of these contain iron in both the ferrous and ferric condition. Those that contain iron only in the ferric condition are weakly ferromagnetic, whereas those that contain iron in both the ferrous and ferric condition are more strongly ferromagnetic. For these types of acicular nucleating agents which contain both divalent elements, particularly magnesium, and trivalent elements, such as aluminum, some or all of the magnesium can be replaced with ferrous iron in the structure without disturbing the crystalline morphology and a significant proportion of the trivalent element, usually aluminum, can be replaced with ferric iron, again without disturbing the crystalline morphology. Through such replacements, the ferromagnetic properties of these acicular materials, generally along the c-axis, are strongly increased. Again, a small but significant portion of the divalent calcium can be replaced with divalent iron and if the mineral also contains the trivalent aluminum ion, a portion of this can also be replaced with the trivalent iron ion again increasing the ferromagnetic properties. A further improvement in ferromagnetic properties, when both di and trivalent ions are present, is the possibility of replacing part of the divalent ion with the cobalt ion, a possibility which has been established mineralogically and through the manufacture of synthetic crystals while at the same time replacing part of a trivalent aluminum with trivalent iron. To some extent, manganese also falls in this beneficial category and as a single element it may be included in the nucleating agents as a partial replacement for both di and trivalent ions in the agent, thereby incorporating a good measure of ferromagnetism. Of the nucleating agents which are listed in Table 1, all of these with the exception of two, namely, item 2 (Larnite) and item 12 (Clinozoisite) exhibit this facility for replacement with the ferro-ferric iron for improvement of its ferromagnetism, a property which will be shown in later discussion to be exceptionally important for the purposes of this invention.

B. POLYMERIC MATERIALS SUITABLE FOR THE PURPOSE OF THIS INVENTION

For convenience, the raw materials suitable for the overall purposes of this invention may be divided into two classes. The first class is the polyalkylene terephthalates available from a variety of sources and in a variety of types to be described hereinafter, and the second class is the general group of engineering plastics which include but is not necessarily limited to the ABS series of plastics (acrylonitrile-butadiene-styrene), polyethylene, polypropylene, polycarbonate, polyamides, thermoplastic elastomers of which the styrene-butadiene copolymers are an example, the polyvinyl chlorides, and the polysulfones.

The polyalkylene terephthalates are usually made by a condensation reaction between the appropriate glycol and either terephthalic acid or dimethylterephthalate. The reaction is normally continued until a molecular weight in the region of at least 15,000 is reached. Polymerization aids, such as compounds of antimony, usually the acetate, with or without the addition of compounds of zinc, again usually the acetate, in small percentages are generally included, along with agents for preventing degradation of the fully formed polymer as a consequence of its exposure to high temperatures. These agents are usually materials such as the aryl and alkyl phosphites, such as triethylphosphite and/or tricresylphosphite. The desired end form is then produced directly from the reactor to yield sheet, film, foil, fiber, or pellet material which last form may be used for injection molding purposes. When manufactured directly into a sheet or fiber, the sheet may be biaxially oriented to improve specific gravity, crystallization and tensile properties, whereas in the case of the fiber, it may be stretched in the direction of extrusion so as to yield the maximum tensile strength along the length of the fiber as a consequence of crystal orientation. In other cases, the material is extruded without mechanical stretching (this is usually the case for the methylene and butylene varieties) into a film form for use as a packaging material. In all cases, the molecular weights are relatively low, the degree of crystallinity seldom exceeds 20 percent and is generally quite substantially below this figure and the product obtained is transparent.

A huge amount of scrap material is available either in-plant or in the hands of the consumer and particularly in the form of fiber, whether used for spinning yarns or for the manufacture of tire cord, and in the form of the polyethylene terephthalate film base which is now commonly used as the standard for photographic film. All of these scrap forms may be recovered in relatively pure form by removing extraneous materials, such as the gelatin emulsion and subbing layers which appear on photographic film, buttons, zippers, and other foreign objects which appear in the scrap yarn and woven cloth and the like.

In general, the higher the molecular weight and the higher the specific gravity of the polyethylene terephthalate raw material, the greater the tendency to crystallize and the easier it is to produce articles of good mechanical properties and particularly high temperature strength.

C. METHOD OF INCORPORATING AND MIXING INGREDIENTS

Irrespective of the nature of the polymer or its source, mixing of the polymer with the various ingredients, such as stabilizers against thermal and untraviolet degradation, the nucleating agents of Table 1, reinforcing agents in fibrous form, sweeping agents for the purposes of this invention, coloring agents, and the like, are always mixed into the polymer in molten form. The polymer is provided in the form of chips of small diameter or as powder and mixed with the various agents indicated in previous sentences in dry form and then passed into a melting and mixing chamber which consists primarily of a reciprocating screw mechanism which may be single or double. Advantageously, the extruded mixture is chilled quickly after being expelled from the body of the chamber, chopped into pellets which are of the order of ¼ inch to ½ inch in length and passed back through the molten stage in the single or double reciprocating screw device to ensure perfect mixing of all the ingredients. The manner in which this material is manipulated in subsequent processing will depend on the application and shape of the article desired by the consumer.

As indicated, in this first mixing step the materials which are normally added to the plastic material in accordance with the state of the art techniques for protection against thermal and ultraviolet degradation of the polymer are added in this stage along with the various other ingredients which might be utilized for nucleation of crystal growth, extension of such crystal growth, and other purposes.

D. METHOD OF ORIENTATION

Orientation of the crystal structure and of the deliberately added crystal materials to the molded parts is accomplished by the controlled application of magnetic fields during the process of molding. Not only can the nucleating agents of ferromagnetic type described in Table 1 be oriented in a desired crystallographic direction by this technique but the polymer crystals which are formed and grow as a consequence of the presence of such nucleating agents are then automatically oriented in the direction of orientation of the ferromagnetic nucleating agent which has been positioned in the forming piece in the desired direction by the applied magnetic field.

By artifices involving additions of other crystalline materials, nucleating agents which are not in themselves ferromagnetic may be placed in the desired alignment and location by the addition of specially designed "magnetic sweeping agents" which thus permits the crystalline growth of the polymer in a nucleated condition to take place again in the desired direction and alignment. Finally, by further modification of these "sweeping agents" not only can the direction of crystal growth of linear polymer itself be controlled but also the alignment of fibrous reinforcement materials of either a non-magnetic or magnetic nature can also be controlled in the desired direction by the application of magnetic fields.

The nature of the various "sweeping agents" their combinations, and of the various types of non-magnetic reinforcing agents which may be aligned readily by the application of suitably disposed magnetic fields will be described in later sections of this specification. In this portion, the generalized techniques for applying the desired magnetic fields will be described.

In order to accomplish the desired alignment by the application of magnetic forces, the throat of the part of the mold leading directly from the ejection nozzle which contains the molten material used for injection molding or other type of forming, such as the manufacture of fiber or sheet or when a non-uniform dimension piece, such as an injection molded part is being made and a non-uniform directional part is being made the sites for application of magnetic forces are so designed so that the desired magnetic forces can be applied in the desired amount and direction.

For fiber and sheet, usually suitably positioned permanent magnets are sufficient for the application of such forces, whereas for an injection molded part either suitably positioned permanent magnets or the application of relative powerful electromagnetic fields are required.

Dealing with the injection molding processes specifically, the molding process involving forming the molten material by ejection from the chamber which contains such a molten material through an opening, generally designated as the throat of the mold, which may take many shapes depending on the speed with which it is desired to have the molten material move into the mold cavity and further the complication required by the dictates of this specification involving orientation and alignment of the crystal structure.

In earlier portions of this description, it was pointed out that incipient crystals may already exist in linear polymer compositions even when these linear polymers are in a fairly molten or liquid state, and such incipient crystals may have lengths in the range of 10 to 150 A. When this material is cooled even into the supercooled liquid state, crystal growth beings and progresses rapidly particularly if proper nucleating agents are present. The speed at which such crystals grow is a combination of the presence of these crystal promoting agents, such as the nucleating agents described and the temperature conditions which permit the crystals to grow more rapidly, and generally the speed of growth bears some relationship to the glass transition temperature and the time intervals during which the material passes through these various states of matter. As explained earlier, providing nucleating forces are present, rapid crystallization generally takes place at or near the glass transition temperature though in some cases this can be accomplished at temperatures substantially above this level. Each of the various linear polymer compositions may operate differently in this respect. For polyethylene, which has an extremely low glass transition temperature, it is almost impossible to achieve the amorphous state in injection molding no matter how rapidly such a material is formed and cooled. Such material passes directly from the completely liquid state to an almost completely crystalline state in extremely short periods of time without showing any particular evidence of the formation of a supercooled condition where the material exhibits all the characteristics of the solid but still shows no evidence of crystallinity.

Advantage of this type of situation is taken in the throat design. Usually, it is desired to have the crystals aligned in a direction parallel to the movement of the material through the throat for most purposes though there are rare occasions where directions at right angles to the direction of movement may be desired. The imposition of this desired direction may be obtained easily by the proper positioning of magnets. In the case where the desired direction or orientation is parallel to the direction of movement of the fluid out of the ejection nozzle, the magnets are placed advantageously as a ring comprising the ejection nozzle itself of the device containing the molten plastic. This ring is then attached to the body of the throat which in itself if non-magnetic and then leads to the entrance of the injection mold itself. This entrance to the injection mold itself is again a ring other suitably shaped enclosure, again produced of magnet material which has been magnetized in a direction opposite to that utilized for the first magnet so that the appropriate north-south pole requirements are maintained. Similar principles will apply to the design and construction of the mold itself particularly if the part being made is relatively small. To accommodate these conditions, the non-magnetic portions of the throat and of the mold are made of non-magnetic metals, such as those based on aluminum and its alloys, copper and its alloys, zinc and its alloys, and other non-magnetic alloys. Slots are placed in the mold to accommodate preformed permanent magnets in such slots for suitable application of the desired magnetic field. The strength and direction of the desired magnetic field may be determined easily by techniques in which mock-ups of the mold design are made, generally in a soft plastic material, places for insertion of various permanent magnets provided and the direction and strength of the desired magnetic field then determined by the patterns made by iron filings placed inside the mold. These simulations are generally sufficient for substantially all practical purposes but in addition, mathematical computation of both the strength and the direction of the magnetic forces which are applied as a consequence of the known characteristics of either the permanent magnets used or the strength of applied magnetic fields may be utilized.

Permanent magnets which are suitable for the purposes of this specification are generally those which exhibit a coercive force in oersteds, normally symbolized by the phrase $H_c$ of a value of 1,000 or greater or more generally in which the product of the remanence (generally designated by the phrase $B_r$ is at least in the range of 1,000,000 or more and preferably at least 2,000,000. The usual method of designation of this product is generally in the form $(BH)_{max}$ or equivalently (Gauss-Oersteds $x\ 10^{-6}$). This product is normally designated as the maximum energy product and as a figure of merit for the determination of the behavior of the permanent magnet. By mutiplying this product by the factor of $10^{-6}$, manageable numbers are then available which indicate that a number of at least 1 and preferably above 2.0 for this maximum energy product defines the preferred series of permanent magnet materials.

Compositions which fall in this category of usable permanent magnet materials are the "Alnicos" which are usually alloys of aluminum, nickel and cobalt with minor amounts of other metals such as copper, titanium and niobium, the "Vicalloys" which are alloys of cobalt and vanadium; and ceramic magnets designated by the tradename "Ferroxdur" which are barium ferrites. Cobalt rare earth magnets are particularly powerful.

A somewhat permanent magnet which does not meet the restrictions imposed by previous paragraphs, but which requires a frequent polarization in view of its relatively low remanence is the alloy designated in the trade as "Silmanol" which is an alloy of aluminum, silver and manganese. This material is of interest because of the extremely high coercive force it exhibits once it is properly magnetized in the proper direction.

For these and any other magnetic materials or magnetic fields which are described in this portion of the specification, the Curie point must be substantially above the highest temperature to which the magnet is subjected. All of the materials which are described in this section are in this category. The Curie point is the temperature at which the material starts to lose its magnetism very rapidly and becomes essentially nonmagnetic or incapable of accepting a magnetic field.

When the mold is relatively large or relatively long distances of applied magnetic force are desired, then a preferred practice is the use of magnetic circuits involving modifications of transformer technology in which magnetic materials with high magnetic permeability are utilized to define the fields of force once a proper electrical field is applied to these high magnetic permeability materials in a proper circuit.

The advantage of the use of transformer circuits involving high magnetic permeability materials with applicable electrical circuits applied thereto is that not only may these circuits be turned on and off at will but very high coercive forces (i.e. high magnetic forces due to the exceptionally high saturation flux density which can be imposed on these materials) are available. Materials falling in this category are generally alloys of iron and nickel such as silicon, manganese, chromium, copper, vanadium, and/or molybdenum. Purified iron in the form of alpha iron or ferritic iron is especially useful. All of these materials have Curie points substantially above the highest temperature to which would be applied to them in the forming of molded process involving the thermoplastics described in this specification.

The strength of magnetic fields useful for purposes of this invention fall generally in the broad range between 1 and 10,000 gauss.

The generalized techniques for control and orientation of injection molded parts have bbeen defined with some degree of particularity. The methods used for producing oriented fiber and sheet in specific directions need to be further defined.

In the case of fiber where the desire is to obtain the maximum of mechanical strength properties in a direction parallel to the length of the fiber, the usual process for orientation and accelerated growth of the crystal involves the application of the magnetic field not only in the condition where the fiber is still in semi-liquid form but also when it is still in the supercooled form before it has reached the maximum degree of crystallinity. Thus, in the case of the formation of polyethylene terephthalate a distance is provided between the outlet of a spinnerette nozzle and the point at which mechanical elongation techniques are applied with a design similar to that previously described in which the "throat" of the spinnerette nozzle is composed of a permanent magnet or the high permeability magnetic material with an applied magnetic field due to the presence of an electrical force followed by a section of non-magnetic material at the end of which is imposed another magnetic field either through the presence of a permanent magnet or a high permeability magnet with associated electrical field of opposite sign so as to permit not only the nucleating materials but the crystals themselves as a consequence of the aligned nucleating materials present or other "sweeping agents" as defined in further sections to be lined up in a direction parallel to a longitudinal direction of the fiber. Normally, the fiber is also mechanically strained again in a direction parallel to the length of the fiber to further accentuate the growth and orientation of the crystal portions of the plastic itself.

In the formation of sheet, monaxial or biaxial stretching is usually imparted to the sheet in order to develop oriented properties in the direction of stretching so as to improve the mechanical properties of the sheet. By utilization of suitably imposed magnetic forces in the presence of the desired nucleating agents, or a combination of these nucleating agents and the sweeping agents to be described hereinafter, even in the absence of such nucleating agents but in the presence of the sweeping agents to be described hereinafter, orientation can be accomplished readily by the application of magnetic forces alone. When orientation plus nucleation is utilized, the superior mechanical properties are obtained without the need for the very complicated biaxial stretching techniques normally used on such materials as polyethylene terephthalate sheet or generally for the polyalkylene terephthalates and in those cases where the crystalline structure of the linear polymer is highly anisotropic.

An important consequence of the method of magnetic orientation is the ability to apply the magnetic fields in such a manner that the orientation can take place in a direction at right angles to the flow of the material going into the mold. This provides the possibility for orientation at right angles to the direction of the flow of materials which is particularly important in many devices such as the injection molding of elastomers for the manufacture of tires and other types of tubulatures.

E. THE FIRST CLASS OF SWEEPING AGENTS

In the section dealing with nucleating agents, it was pointed out that the weight percent range in which these nucleating agents were effective was a function of the particle size the smaller the particle size, the less the amount which was needed. A preferred range of particle size is in the region of 1 micron or less in which the maximum amount of nucleating agent needed to produce the desired result is of the order of 1 weight percent. When these nucleating agents are ferromagnetic and susceptible to orientation by magnetic fields as described in the previous section, a slight tendency will be exhibited for these materials to gather close to the source of the magnetic field. This tendency can be eliminated or reduced by the speed with which the material is injected into the mold and through the throat leading to the mold. This question of gathering close to the seat of the magnetic influence versus the degree of ferromagnetism of the materials being placed in the structure becomes increasingly important as the degree of ferromagnetism of the materials added is increased.

The class of sweeping agents to be described are non-metallic, high magnetic susceptibility materials in acicular form, all of which exhibit amply high Curie points. These materials are used to accelerate or force the orientation of the nucleating agents in the desired direction. These are listed in Table 2.

TABLE 2

CLASS 1 - SWEEPING AGENTS - MAGNETIC SUSCEPTIBILITY AND CRYSTAL STRUCTURE

|  | Susceptibility $10^{-6}$ ergs | Crystal Morphology | Acicular |
|---|---|---|---|
| $Cr_2O_3$ | 1,960 | Hexagonal | Yes |
| $CrO_2$ | 22,000 | Monoclinic | Yes |

TABLE 2 — Continued

CLASS 1 - SWEEPING AGENTS - MAGNETIC SUSCEPTIBILITY AND CRYSTAL STRUCTURE

| | Susceptibility $10^{-6}$ ergs | Crystal Morphology | Acicular |
|---|---|---|---|
| $Cr_4(P_2O_7)_3$ | 18,000 | Monoclinic | Yes |
| $CoO$ | 4,900 | Tetragonal | Yes |
| $Co_2O_3$ | 4,560 | Hexagonal | Yes |
| $Co_3O_4$ | 7,380 | Cubic | Yes* |
| $Co_3(PO_4)_2$ | 28,110 | Monoclinic | Yes |
| Rare Earth Oxides except La, Y and Ce | 10,000 to 100,000 | Hexagonal | Yes |
| Rare Earth Phosphates except La, Y, and Ce | 25,000 to 150,000 | Monoclinic or rhombohedron hexagonal - tetragonal | Yes |
| $Fe_2O_3$ | 3,586 | Hexagonal | Yes |
| $Fe_3O_4(ac)$ | 8,600 | Cubic | Yes* |
| $FePO_4$ | 11,500 | Rhombohedron | Yes |
| $MnO$ | 4,580 | Hexagonal | Yes |
| $Mn_2O_3$ | 14,100 | Tetragonal | Yes |
| $Mn_3O_4$ | 12,400 | Tetragonal | Yes |

In view of their high degree of ferromagnetism and magnetic susceptibility, these kinds of sweeping agents are much more readily aligned in a magnetic field than the relatively weakly ferromagnetic nucleating agents which are defined in Table 1. As a consequence of this speedly alignment, they tend to sweep other solid materials into the same general alignment as they themselves exhibit as a consequence of the influence of the magnetic field. In order to obtain the maximum effect of this kind of sweeping agent I have found that the volume of these sweeping agents should be at least twice the volume of the nucleating agent. Since the specific gravity of these sweeping agents is generally in the range of equal to and up to twice the specific gravity of the nucleating agent, a general figure for maximum effectiveness is to use approximately four times the weight of this type of sweeping agent of that of the nucleating agent normally used.

Thus, if the nucleating agent having a particle size in the range of 0.1 to 0.5 microns is utilized in well crystallized condition, a proper amount of nucleating agent in this particle size range would be in the range of 0.01 to 1 percent, then the amount of acicular high magnetic susceptibility sweeping agent which is added to accelerate the positioning of these nucleating agents and the polymeric crystals which grow in the proper direction as a result would be approximately four times the weight or in the region of at least 0.04 to 4 percent by weight of the polymer.

In examining the materials and properties of the sweeping agents listed in Table 2, a distinction can be made between the ferromagnetic and paramagnetic properties of these materials. The ferromagnetic materials generally exhibit a quite high susceptibility and a significant portion of the magnetic force remains after the magnetic field is removed varying with each material and depending on the relative degree of paramagnetism versus ferromagnetism. Generally speaking, certain oxides of metals, such as iron, chromiun, manganese and cobalt tend to be more ferromagnetic than paramagnetic, whereas the phosphates of these elements, and the oxides and phosphates of the rare earths then to show a high degree of paramagnetism.

Materials which exhibit a high degree of paramagnetism, however, even though they may show very high magnetic susceptibilities and can be aligned readily in a magnetic field, lose practically all of the magnetism once the magnetic field is removed. This defines the manner in which these sweeping agents may be used in a practical sense. If the degree of ferromagnetism is high relative to the paramagnetism of the material, then the use of alternating fields of magnetism are generally preferred by the application of an external source through the medium of a high permeability insert. This leads to a significant decrease in the amount of material which will tend to gather around the area of highest magnetization. In addition, the speed with which the material flows into the mold also is beneficial in aiding a sweeping action to take place so as to push these materials that tend to congregate around the areas of highest magnetization away from these areas and place them in their proportions in the piece to be prepared. This is automatically the case when a continuously moving fiber or shape is being prepared since the speed of production of these fibers and sheet is so high that the tendency for the magnetic particles to congregate at the areas of greatest magnetization is sharply reduced. This becomes a more serious problem when injection molded parts are utilized and here a combination of alternating fields and rapid filling of the mold is sufficient to eliminate the problem.

In summary of this section, the use of these sweeping agents facilitates the alignment of the nucleating agents which in turn facilitates the alignment of the linear crystals available from the crystallizing polymer and substantial increases in physical properties in the desired direction are thereby obtained.

F. THE SECOND CLASS OF SWEEPING AGENTS

The second class of sweeping agents to be used as an aid in alignment of both the first class of sweeping agents and the nucleating crystals themselves but also eventually for the alignment of non-magnetic reinforcing material are taken from the class of brass plated high permeability ferromagnetic materials in short wire form. Such wires will have diameters of the order of 10 microns or less and lengths up to 100 to 2,000 microns. State of the art techniques are available for producing wire in these diameters. Materials in this class are chosen which have the highest possible permeability with the lowest possible remanence. They are difficult to use with permanent magnets which exhibit very high remanence unless the speed of the flow of material is extremely high. If the speed is not extremely high, then a large tendency exists for these high permeability ferromagnetic materials to congregate at the source of highest magnetism and block the flow and the orientation of the desired product. Thus, oscillating or alternating electric fields are utilized in which the field moves rapidly from the highest intensity to zero intensity and then back. Good results are obtained when the alternation takes place at no more than 2 to 3 times per second. With materials exhibiting low remanence these high permeability wires will lose sufficient of their magnetism so that they can be swept out of the area of highest magnetic forces by the speed with which the material is being injected or moving in a particular cavity and then reassume their proper alignment once they are inside the cavity without the tendency for collecting around the areas of highest magnetism. Situations of this type are much easier to control when a continuous form is being prepared such as a fiber or sheet and more difficult to control when a fixed injection molded part is being made. Under these conditions, extremely high speeds of injection are required.

One method of accomplishing this procedure is to use a throat which is divided into two sections. The first section is relatively narrow and permanent magnets can be used in this narrow section because through this narrow section the flow of the material is extremely high. The throat then opens up very substantially, weaker magnetic forces of oscillating or alternating nature are then applied thereby reducing the tendency toward aggregation at the points of highest magnetization.

From the combination of speed of flow, strengths of magnetic field, and oscillation, a uniform distribution of magnetic materials can then be accomplished in the molded article.

In proper use of these sweeping agents relative to orientation of crystal growth, it has been found that many thermoplastics, particularly those in the linear homopolymer class or in the linear class generally have a tendency to crystallize with extreme rapidity and consequently nucleation for initiation of the crystallization in accelerating the growth of such crystallization is not usually required. It has been further found that the use of the sweeping agents for these types of linear homopolymers, and particularly the polyolefins and to a somewhat lesser extent the polyamides, exhibit a surprising degree of orientation as manifested by improvement in their physical properties in the direction of orientation through the use of either the materials listed in Table 2 or combinations of these materials and the high magnetic permeability with relatively low remanence characteristics of the metallic wires described in this section. These materials or the combinations described apparently exhibit a mechanical sweeping action which acts on the direction of crystallization of the polymer to force the direction of crystallization along the lines of force as imposed by the magnetic field.

It has been pointed out that one of the problems associated with using highly ferromagnetic materials such as iron wires as an aid to the sweeping action is the tendency for these highly ferromagnetic materials to congregate in the area of the source of the magnetic field which either may block continued movement of the material to be formed or may yield non-uniform properties. Under these situations, a somewhat different method of molding and application of the magnetic field is utilized which eliminates the problem. In injection molding, the polyethylene terephthalate material is injected rapidly into a cavity preferably at or considerably above the glass transition temperature which is approximately 120° C. (248° F.) and below the fluid melting point of the material which is in the region of 250° to 290° C. (480° to 555° F.). No magnetic field is applied during the filling of the mold which is carried out as rapidly as possible and, if the throat design is proper, this mold filling can be completed in less than 1 second for specimens which weigh less than about 5 or 6 ozs. As a consequence of contact of the molten material with the good heat conducting metallic surface of the interior portion of the mold a solid skin forms almost immediately as a consequence of such contact even though such solid skin may still be in the supercooled state. Then, immediately the mold is filled the external magnetic field is applied which is capable of aligning the most strongly magnetic materials present very easily which in turn have their desired action on the weakly magnetic material as a consequence of the sweeping action developed thereon and also in turn line up the nucleating agents, all accomplished in a very short space of time in view of the presence of this solid skin while the interior of the part is still semi-liquid. Thus, nucleation, orientation and alignment takes place in the body of the piece in the desired direction and amount without the danger for aggregation at the pole pieces which might seriously hinder the proper flow of materials into the cavity. Relatively cold molds can be used to accomplish the same purpose except that even shorter times between filling the mold and application of the magnetic field are required to obtain the desired degree of alignment. In this case of films and fibers, the magnetic field can be applied after the material has been ejected from the proper forming orifice and since air gaps exist and the solid skin forms almost immediately after ejection providing ejection is into an atmosphere or a fluid which has a temperature substantially below the melting point, the desired alignment can be forced to take place in the presence of even the most strongly ferromagnetic fibrous materials without any possibility of these fibrous materials gathering at a particular portion of the piece particularly in view of the fact that during forming the fiber or sheet material is moving past the magnetic field at a very rapid rate so that the dwell time is extremely short.

This sweeping action develops a greater significance in accordance with the description of the portion of the invention included in the next section.

G. FIBROUS REINFORCING AGENTS

Through, in many cases, a variety of ground up minerals can be utilized for reinforcing a thermoplastic, or for that matter, even a thermosetting material, commonly used reinforcing agents are fibrous in nature, comprised of glass, asbestos, wollastonite and/or synthetic ceramic fibers. These synthetic ceramic fibers are sometimes called glass wool since they are made of compositions which are normally not utilized in the manufacture of ordinary glass. In many cases, they are more refractory variations of high temperature glasses and the usual technique for their manufacture is to turn them into fibrous form by blowing high pressure steam or air through the molten stream that is produced while the material is being poured out of the crucible in which the material is initially melted.

The advantage of the use of these ceramic fibers for the purposes of this invention is that iron compounds can be incorporated in these ceramic fibers to a minor extent without experiencing a marked decrease in their tensile strength, the amount of iron compounds being incorporated being sufficient to make them ferromagnetic so that they themselves can act as sweeping agents.

The base glasses which may be made by this technique are derived from fundamental formulations such as calcium aluminum silicate, calcium magnesium aluminum silicate, aluminum phosphate and the like. As a consequence of modifying these glasses, magnetic materials of the type given in Table 2 can be incorporated in these ceramic fibers to yield a degree of ferromagnetism and/or paramagnetism so that they can operate not only as reinforcing agents but also can be aligned in a desired direction for improvement of physical properties in such direction by themselves. Thus, such magnetically modified synthetically made ceramic fibers not only act as sweeping agents in themselves for aid in lining up non-magnetic nucleating agents, but at the same time can in themselves act as fibrous reinforcements which are lined up in the proper direction. These kinds of ceramic fibers are particularly useful since the degree of ferromagnetism and/or paramagnetism can be modified to a good extent by the amount of high magnetic susceptibility oxides that can be incorporated in them and all of the materials listed in Table 2 in oxide and/or phosphate form fall in this category.

However, a second and much more important effect is obtained if one is required to use non-magnetic reinforcements entirely.

Fibrous reinforcments which fall in the category of completely non-magnetic materials may be taken from the glass, asbestos, wollastonite, and synthetic ceramic fibers which do not contain elements or portions of the compounds as listed in Table 2. Of these a particular variety of asbestos which may be designated as "fluffed chrysotile asbestos" is preferred.

Amphibole asbestos is somewhat superior to chrysotile asbestos in its utility but in view of its scarcity and high cost, it it much less commonly used than chrysotile. While most varieties of asbestos are available in very long lengths, the most commonly used form for reinforcement of plastic systems is chopped asbestos generally in lenghts varying from ⅛inch up to ⅔inch. In the chopping process the widths of the individual fiber bundles which are obtained as a result may vary in widths from as low as 10 microns up to 200 microns or more in width.

Careful examination of these bundles of chopped fibers has established that each presumably individual fiber or asbestos is actually made up of many thousands or more still smaller diameter fibrils and such examinations have indicated that theoretically, that at least, the width of the individual fibril is no more than a few molecules.

Since the efficiency of reinforcement of a fibrous material in a plastic matrix is a function of the surface area of the fibrous material exposed it would be of great advantage to have the choppd fibrous asbestos reduced to its smallest reasonable diameter. This can be accomplished, in the case of asbestos, by transforming the chopped fiber asbestos into a so-called "fluffed" form. This involves immersing the fiber in at least 10 and preferably 100 times its volume of distilled or deionized water which contains approximately 1 percent of a wetting agent such as aerosol OT which is a complex sodium salt of an organic acid. A variety of cationic wetting agents which contain alkalis as the cation are suitable for the purpose. The mixture of asbestos, cationic wetting agent and deionized distilled water is stirred thoroughly and then allowed to stand quietly for at lest 24 hours and generally for periods up to 96 hours. During this standing period, the fiber bundle breaks down to smaller and smaller fibrils to a point where a fiber which was originally tens of microns in diameter is now composed of many thousands of fibers which are minute fractions of a micron in diameter with the length remaining the same. The water is removed by successive washings in alcohol which may or may not be followed, depending on the types of surface active agents which have to be added at a later time, with combinations of alcohol and toluene and followed finally by pure toluene. Surface active agents are added in the last stages which will adsorb on the surface of the asbestos fiber so as to make these materials compatible with the polymeric system and promote the adherence of the asbestos to the polymer components. For example, if the polymer contains substantial amounts of hydroxyl end groups, a small percentage of citric acid or other organic acid is added in the final washing stages to develop the bond between the asbestos and the polymer itself. If a polymer contains acid end groups such as carboxyls, then a slightly basic material such as an organic amine is added for surfacing of the asbestos. These surface active agents for promoting adhesion are generally added in an amount of about 1 percent of the total amount of fluffed asbestos.

To serve as an indication of the degree of fluffing which takes place one needs only to measure the bulk specific gravity and the relative increase in bulk specific gravity as a consequence of the fluffing action after the asbestos has been thoroughly dried. For example, if one starts with 100 cubic centimeters of normally chopped chrysotile asbestos, after suitable fluffing and treatment as described in previous paragraphs, the same 100 centimeters will then occupy a volume of the order of 1,000 to 3,000 cubic centimeters. An examination under the microscope, especially at the highest levels of fluffing indicates that the diameter of the individual fibers are now in the range of either fractions of microns or in diameters which are below the limit of resolution of an optical microscope.

The reasons for carrying out this fluffing operation is that a product is obtained which exhibits an exceptionally low mass relative to its original length which is retained in the fluffing operation and as a consequence of this extremely low mass it is easily moved by the type of mechanical force which can be imparted to the particle through the use of the various sweeping agents which had been moved in the direction of desired alignment by magnetic forces. In addition, in view of the exceptionally high surface area which has been exhibited by this fluffed asbetos an exceptional amount of reinforcement is achieved with relatively low concentrations of fiber. Consequently, when fiber in the unfluffed condition, as is normally used, normally will require a loading of the order of 20 to 50 percent in order to achieve the maximum of reinforcement which one can expect by the combination of reinforcing fibers and thermoplastic base. Equal or even better results are achieved from the fluffed material with weight loadings of 10 percent or less.

Thus, in summary of this section, fibrous reinforcements of both non-magnetic and magnetic types may be used to increase the directional properties of the thermoplastic being produced. Not only can those fibers, synthetically made, which show a combination of ferromagnetism and paramagnetism be aligned in a proper direction for a maximum reinforcement but also a non-magnetic fiber such as the fluffed asbestos described in this secion can be swept into a proper alignment by the imposition of magnetic forces on other fibrous magnetic materials which are present in the composition.

H. THE DEVELOPMENT OF VARIOUS PHYSICAL PROPERTIES OF POLYALKYLENE TEREPHTHALATES AS A CONSEQUENCE OF VARIATION IN MOLDING AND FORMING CONDITIONS

It can be determined that linear relationships exist between such easily measured parameters as specific gravity and relative viscosity and the properties which determine the physical characteristics of a molded polyethylene terephthalate such as crystallinity and molecular weight, there appearing to be a direct relationship also between crystallinity and molecular weight. In addition, all of the physical properties of the various polyalkylene terephthalates and other polymers can be modified substantially by such devices as the nature of the heat treatment after polymerization, the effectiveness of nucleating agents for promotion of crystallization and the increasing of molecular weight, the temperature of molding and similar factors. While the degree of variations in comparing the various polyalkylene terephthalates differ in rate and extent, in general the variations that may be anticipated as a consequence of applying a particular treatment, specifically those involving heat treatment, nucleation and preferred and controlled orientation proceed in the same general direction and extent with such similarity that each member of the group of polyalkylene terephthalates can be expected to be varied similarly with similar treatments.

Probably the most important single parameter with regard to the development of desired physical properties in this group of materials is the percentage of crystallinity.

I. THE PHYSICAL PROPERTIES OF THE POLYALKYLENE TEREPHTHALATES AS A FUNCTION OF HEAT TREATMENT

The physical properties of the polyalkylene terephthalates and particularly th polyethylene terephthaltes, can be modified broadly by the application of mechanical stress while these materials are in the supercooled liquid form and appear to be much more susceptible to variations in heat treatment, though a combination of suitable heat treatment and mechanical stress complement each other.

Probably the most important parameter defining the nature of the physical properties which can be obtained is a measure of the degree of crystallinity, which subject has been discussed in some detail in prior portions of this specification.

On method for increasing the crystallinity of the polyalkylene terephthalates and again particularly the polyethylene terephthalates is the use of post-condensation in the solid state which usually involves heat treatment at temperatures of the order of 230° to 250° C. in a vacuum of 0.1 to 10 millimeters for periods up to 60 hours. Depending on the molecular weight and crystallinity of the original polyethylene terephthalate which is subsequently subjected to post-condensation, this vacuum treatment can change a substantially amorphous non-crystalline material into a much higher specific gravity material showing varying degrees of crystallinity.

TABLE 3

PHYSICAL PROPERTIES OF VARIOUS POLYALKYLENE TEREPHTHALATES UNDER VARIOUS CONDITIONS

|  | PBT[1] | PMT[2] | PET[3=] | PET Com. Grade[3] | PET 6 | PET 6 | PET 6 | PET 6 | PET 6 | PET 6 |
|---|---|---|---|---|---|---|---|---|---|---|
| Tensile Strength | 8,000 | 8,200 | 8,500 | 10,000 | 8,000 | 10,500 | 8,500 | 9,000 | 10,000 | 10,500 |
| Elongation | 300 | 250 | 200 | 75 | 300 | 50 | 300 | 750 | 250 | 250 |
| Flexural Strength | 12,000 | 12,000 | 14,500 | 16,500 | 12,500 | 17,500 | 12,000 | 13,500 | 16,500 | 17,000 |
| Mold Temperature | 125°F | 100°F | 195°F | 275°F | 150°F | 150°F | 150°F | 200°F | 255°F | 325°F |
| Starting Specific Gravity | 1.31 | 1.31 | 1.40 | 1.40 | 1.355 | 1.355[7] | 1.40[6] | 1.40 | 1.40 | 1.40 |
| Time in Mold (Seconds) | 20 | 20 | 20 | 20 | 20 | 20 | 20 | 20 | 20 | 20 |
| Crystallinity Percent | <10% | <10% | 28% | 37% | 15% | 37% | 15% | 23% | 34% | 37% |
| Finish Specific Gravity | 1.30 | 1.30 | 1.375 *Com Grade[(4,5,8)] | 1.40 | 1.355 | 1.40 | 1.35 | 1.37 | 1.38 | 1.40 |

[1]Polybutylene Terephthalate
[2]Polymethylene Terephthalate
[3]Polyethylene Terephthalate
[4]Netherlands Application No. 6,608,999; February 27, 1967
[5]Netherlands Application No. 6,515,106; February 27, 1967.
[6]Prepared as described in this specification.
[7]Annealed specimen - see specification.
[8]Netherlands Application No. 6,617,992; February 27, 1967.
[9]All the above contain 1% tricresyl phosphite for thermal stabilization in molten state prior to injection.

Examination of the data given in Table 3 exhibits some of the effects of varying kinds of heat treatments on the crystallinity and physical properties. In these cases, not only is the prior heat treatment important but also the temperature at which the material is molded. Thus, for example, polyethylene terephthalate which has not been subjected to post-condensation treatment is essentially amorphous, will exhibit a specific gravity of approximately 1.335 and will generally show a crystallinity of less than 5 percent. By utilizing the vacuum treatment heretofore described, both the specific gravity and the crystallinity can be regularly increased as a function of the time of treatment in the post-condensation step in the solid state under vacuum conditions. Through such post-condensation steps crystallinities up to close to 100 percent can be achieved, providing, however, sufficient stabilizers are present to prevent thermal degradation. By varying the conditions of post-condensation, followed by injection molding, percent or greater.

parts can be made which exhibit a tensile strength of the order of 8,000 lbs. p.s.i. with an accompanying elongation of around 300 percent, this being equivalent to a specific gravity in the range of 1.35 to 1.36 and a crystallinity in the region of 15 percent and up to a tensile strength of 10,500 to 11,000 lbs. p.s.i., elongations of 250 percent with crystallinities in the range of 34 to 37 percent.

Starting with the material exhibiting a specific gravity in the range of 1.335 (essentially an amorphous non-crystalline material) and subjecting this material to a post-condensation for 30 hours at 230° C. at a vacuum of 0.1 millimeters, a specific gravity in the range of 1.40 to 1.42 is achieved and the crystallinity obtained as a consequence is claimed to be 28 percent. This material was originally polymerized using antimony oxide as the catalyst without any specialized materials added deliberately to prevent thermal degradation on post-condensation. Contrarywise, a material containing a mixture of zinc and antimony compounds as a polymerization catalyst and utilizing triaryl phosphites as a stabilizer against thermal degradation was polymerized in the normal manner using the same degree of post-condensation as defined in reference 4 and 5 of Table 3. Again, using the identical post-condensation cycle, this type of polyester exhibited a crystallinity of 34 percent as against the 28 percent shown for the references of record.

The degree of crystallinity and the nature of the physical properties as a function of heat treatments utilizing the type of polyethylene terephthalate which was polymerized originally with a combination of zinc and antimony salts as catalysts in the presence of aryl phosphite stabilizers has been described earlier in this specification. If this material is post-condensed in accordance with the heretofore described conditions for about 5 hours, a gravity of 1.355 is obtained with a crystallinity of 15 percent as shown in the tables, when the material is injection molded into a mold having a temperature of 150° F. When this same material is again injection molded into a mold having a temperature of 150° F. (65° C.) and then annealed at approximately 300° F. (150° C.) for 5 minutes after it has been ejected from the mold, the specific gravity is increased from 1.355 to 1.40, the tensile strength is increased, and the degree of crystallinity is increased to 37 percent.

If polymerized PET is abruptly cooled after extrusion an amorphous and transparent material is obtained, this being the desired requirement for the formation of transparent sheet. Such materials will have tensile strengths in the range of 7,000 to 8,000 p.s.i. and generally will exhibit an elongation in the region of 300 percent. If this material is annealed for a short period of time at 150° C., as indicated previously the object becomes opaque, the specific gravity is increased, the crystallinity is increased, and the tensile strength obtained will be in the region of 10,000 to 11,000 p.s.i., with an elongation varying between 50 and 300 percent depending on the temperature at which this material is annealed and also the specific gravity and crystallinity which is available in the starting materials. These effects are much more pronounced with relatively high gravity starting materials than with low gravity starting materials although the same general trends are exhibited in either case. Thus, transparent, essentially amorphous, relatively low tensile strength (about 8,000 p.s.i.) and high elongation (about 300 percent) can be obtained by injection molding of materials exhibiting a specific gravity of around 1.36 into a mold that is at 150° F. or cooler. If such materials are then annealed to 150° C. as indicated previously, the specific gravity increases, the degree of crystallinity increases, the tensile strength increases and the elongation is decreased somewhat.

Thus, as defined in this section and to some extent summarized in Table 3, heat treatment of various types may have a profound effect on the mechanical and physical properties of a shaped article produced from the polyalkylene terephthalates and particularly the polyethylene terephthalate.

The figure of merit which represents the clearest definition of the combined effect of these various heat treatments is the degree of crystallinity which in turn appears to be a function not only of specific gravity but also of relative viscosity which again in turn appears to be a function of molecular weight.

The description in this section and the data given in Table 3 are introduced at this juncture to serve as a basis for establishing the nature of the improvements which are imparted to molded polyethylene-terephthalate parts as a function of the novel materials and procedures defined in the present specification.

EXAMPLES

Having described my invention and the platform on which the invention is based, such platform being detailed in Table 3, following are examples of my method of practice.

Examples 1 through 10 are summarized in Table 4. In this particular set of examples the polymer of the starting specific gravity listed was mixed with the nucleating agent and tricresyl phosphite under a nitrogen blanket while the polymer was maintained in the molten state. The melting temperature used for this purpose was in a range of 500° to 535° F. (260° to 280° C.) and the mixer utilized was a high intensity sigma type mixer. A period of 3 to 5 minutes mixing in the molten state was sufficient to obtain the desired degree of uniformity. The mixer is fitted with a heremetically sealed top with seals capable of withstanding pressures up to 1,000 p.s.i. After mixing is completed, the molten mixture was transferred by ejection and transferred directly to the barrel of a reciprocating screw injection molding machine.

The results obtained as a function of various starting conditions such as starting specific gravity and molding temperature are defined in Table 4. Not only is the profound action of the nucleating agent established but also the effect of starting specific gravity and molding temperature on the physical properties of the finished products, such variations being in accordance with the effect of similar type variables as defined in Table 3.

Physical data not defined in Table 4 is of particular interest. The physical properties of the injected molded structure are approximately equivalent irrespective of direction indicating that no specific orientation has taken place. The notch resistance of a non-nucleated specimen and particularly one which shows a crystallinity of 30 percent or less is generally in the range of 1.0 to 1.2 foot pounds. However, it is interesting to note that as the crystallinity increases in these non-oriented specimens the notch resistance rises steadily to a point where it reaches a figure of approximately 3 foot pounds and a crystallinity level of about 65

Most important, however, is the very substantial improvement exhibited over the prior art. For example, Netherlands Application No. 6,515,106 (reference 5 from Table 3 of this specification) claims that the crystallinity of a post-condensed polyethylene terephthalate under similar post-condensation conditions are used in this description was apaproximately 28 percent and after the addition of crystalline accelerating liquids and nucleating agents, the crystallinity obtained was 34 percent, indicating that in accordance with the prior art the addition of crystalline promoting liquids and the nucleating agents described in the prior art had a relatively slight effect on the crystallinity and the physical properties of the finished specimens. These references from the prior art, however, do not define the use of a thermal stabilizer in remelting as utilized in these specifications so that strictly speaking the data are not totally comparable. Nevertheless, through the addition of these stabilizing agents, coupled with a proper choice of molding conditions, crystallinities of same order of magnitude as defined in Netherlands Application No. 6,515,106 can be obtained without the use of crystalline promoting liquids or the nucleating agents defined in the referred to Netherlands application as shown in Table 3. More important, however, is te pronounced improvement in crystallinity which is exhibited by the presence of a properly chosen nucleating agent utilizing a sutiable thermally stabilized polyalkylene terephthalate. These improved results are particularly notable on examination of the crystallinity data reported in Table 4.

TABLE 4

EFFECT OF NUCLEATING AGENT (BETA-CALCIUM-ORTHOSILICATE) ON PHYSICAL PROPERTIES OF POLYALKYLENE TEREPHTHALATES[1,2]

| EXAMPLE NO. | 1 | 2 | 3 | 4 | 5 | 6 | 7 | 8 | 9 | 10 |
|---|---|---|---|---|---|---|---|---|---|---|
| Type polyalkylene-terephthalate | PBT | PBT | PMT | PMT | PET | PET | PET | PET | PET | PET |
| Molding Temperature | 125°F | 250°F | 100°F | 250°F | 100°F | 150°F | 255°F | 100°F | 150°F | 255°F |
| Starting Specific Gravity | 1.31 | 1.31 | 1.31 | 1.31 | 1.355 | 1.355 | 1.355 | 1.400 | 1.400 | 1.400 |
| Finish Specific Gravity | 1.34 | 1.37 | 1.34 | 1.37 | 1.385 | 1.395 | 1.410 | 1.420 | 1.450 | 1.480 |
| Starting Crystallinity | <10% | <10% | <10% | <10% | 15% | 15% | 15% | 37% | 37% | 37% |
| Finish Crystallinity | 22% | 32% | 20% | 30% | 30% | 35% | 43% | 48% | 65% | 84% |
| Tensile Strength p.s.i. | 9,300 | 10,400 | 9,500 | 11,000 | 10,000 | 11,000 | 12,500 | 14,000 | 16,000 | 19,000 |
| Elongation (%) | 170 | 80 | 150 | 60 | 200 | 150 | 100 | 150 | 100 | 60 |

[1] Mixed into polymer in molten state under nitrogen before injection molding. Also add 1% tricresylphosphite for stabilization purposes prior to melting.
[2] Particle size of nucleating agent is 0.3 microns; amount of nucleating agent for each example is 0.1% by weight of the polymer.

Examples 11 through 25 are shown in summarized form in Table 5. These materials were mixed in the molten state with the nucleating agents defined in Table 1 and with the addition of the tricresyl phosphite for stabilizing purposes in the manner described for the examples shown in Table 4 and injection molded also in the manner previously described. In general, the evidence indicates that all of the nucleating agents of the generic description given in previous portions of this specification are effective for purposes of improving crystallinity and physical properties. However, there is a trend, not too well defined, which indicates that the similarity of the beta angles of the nucleating agent and the beta angle of the base polymer is probably a more important concomitant variable for improvement of crystallinity and physical properties than the required similarities between various cell axes.

TABLE 5

EFFECT OF NUCLEATING AGENTS LISTED IN TABLE 1 ON PHYSICAL PROPERTIES OF PET
(SPECIMENS MOLDED AT 325°F. AND 20 SECONDS HOLDING TIME)

| Example Number | Nucleating Agent Name Table 1 | Particle Size-microns | Percent Agent | Starting Specific Gravity | Finish Specific Gravity | Starting Crys. % | Finish Crys. % | Tensile Strength p.s.i. | Elongation Percent |
|---|---|---|---|---|---|---|---|---|---|
| 11 | 2 | 0.1 | 0.2 | 1.400 | 1.445 | 37 | 63 | 16,000 | 110 |
| 12 | 2 | 0.5 | 0.5 | 1.400 | 1.442 | 37 | 59 | 15,500 | 125 |
| 13 | 2 | 1.0 | 2.0 | 1.400 | 1.440 | 37 | 56 | 15,000 | 135 |
| 14 | 2 | 2.0 | 3.0 | 1.400 | 1.433 | 37 | 53 | 14,500 | 140 |
| 15 | 4 | 1.0 | 0.5 | 1.400 | 1.420 | 37 | 48 | 14,000 | 150 |
| 16 | 4 | 0.5 | 1.0 | 1.400 | 1.430 | 37 | 51 | 14,200 | 150 |
| 17 | 5 | 0.3 | 1.5 | 1.400 | 1.440 | 37 | 56 | 15,000 | 100 |
| 18 | 6 | 0.5 | 1.0 | 1.400 | 1.425 | 37 | 50 | 14,100 | 125 |
| 19 | 7 | 1.5 | 2.0 | 1.400 | 1.410 | 37 | 44 | 12,500 | 200 |
| 20 | 8 | 1.5 | 3.0 | 1.400 | 1.405 | 37 | 39 | 11,000 | 250 |
| 21 | 9 | 0.5 | 1.0 | 1.400 | 1.471 | 37 | 77 | 18,000 | 75 |
| 22 | 10 | 0.3 | 1.0 | 1.400 | 1.456 | 37 | 68 | 16,500 | 100 |
| 23 | 11 | 0.2 | 3.0 | 1.400 | 1.416 | 37 | 46 | 13,600 | 160 |
| 24 | 12 | 0.5 | 1.0 | 1.400 | 1.475 | 37 | 54 | 14,500 | 135 |
| 25 | 13 | 0.5 | 1.0 | 1.400 | 1.445 | 37 | 63 | 15,800 | 125 |

1. Vacuum treated at 230° C., 10 microns pressure, for 30 hours before admixture in molten state with nucleating agents (polyethylene terephthalate) and 1% tricresyl phosphite as a thermal stabilizing agent. Mixing in molten state carried out for 3 to 5 minutes under a nitrogen blanket.

Examples 26 through 34 are summarized in Table 6 and define the effect of a combination of nucleating agents, plus the non-metallic magnetic sweeping agents with and without the presence of the magnetic field.

gation is increased by a factor of 20 to 50 percent, thus establishing the strongly directional aspects imposed by the nature of combinations and conditions defined for Examples 31 through 34.

TABLE 6

EFFECT OF NUCLEATING AGENTS PLUS NONMETALLIC SWEEPING AGENTS (TABLE 2) ON PHYSICAL PROPERTIES OF PET (POLYETHYLENETEREPHTHALATE)

| Example Number | Nucleating Agent Name Table 1 | Particle Size Microns | Percent Agent | Sweeping Agent | Particle Size Microns | Percent Agent | Molding Temp. 150°F. T.S. p.s.i. | Molding Temp. 150°F. Elong. % | Molding Temp. 325°F. T.S. p.s.i. | Molding Temp. 325°F. Elong. % |
|---|---|---|---|---|---|---|---|---|---|---|
| 26[2] | None | — | — | None | — | — | 8,500 | 300 | 10,500 | 250 |
| 27[3] | 10 | 0.3 | 1.0 | None | — | — | 11,500 | 200 | 16,500 | 100 |
| 28[2] | 10 | 0.3 | 1.0 | None | — | — | 13,500 | 180 | 21,000 | 80 |
| 29[3] | None | None | None | Acicular iron oxide | 1.0 | 5.0 | 7,800 | 210 | 9,500 | 180 |
| 30[2] | None | None | None | Acicular iron oxide | 1.0 | 5.0 | 8,900 | 300 | 10,900 | 250 |
| 31[2] | 10 | 0.3 | 1.0 | Acicular iron oxide | 1.0 | 5.0 | 16,000 | 170 | 25,000 | 70 |
| 32[2] | 10 | 0.3 | 1.0 | $Co_3(PO_4)_2$ | 0.5 | 4.0 | 17,500 | 150 | 27,000 | 60 |
| 33[2] | 10 | 0.3 | 1.0 | $Gd_2O_3$ | 1.0 | 6.0 | 15,500 | 180 | 23,000 | 70 |
| 34[2] | 10 | 0.3 | 1.0 | $Gd PO_4$ | 0.5 | 4.0 | 17,000 | 150 | 24,000 | 70 |

[1]Vacuum treated polyethyleneterephthalate for 30 hours at 230° C. at 10 microns. Mixed in molten state with above plus 1% tricresyl phosphite.
[2]Applied magnetic field; 5,000 gauss, alternated.
[3]No magnetic field applied.

Again, the starting raw materials were mixed and injected in the manner as described for the examples covered by Table 4.

In examining these data, it should be pointed out that in the absence of nucleating agents and non-metallic magnetic sweeping agents relative to the normal polyethylene terephthalate as defined in this specification, that the application of a magnetic field has relatively no effect on the physical properties of the finished product. The application of a magnetic field on a nucleating agent which exhibits magnetic properties and its beneficial effect is defined by comparison of examples 27 and 28. Example 29 shows that relatively little, if any, improvement in physical properties is shown by the presence of the acicular sweeping agent in the absence of a nucleating agent and while some improvement is obtained under these conditions as shown in Example 30 on the application of a magnetic field the improvement is relatively minor, indicating that these acicular sweeping agents are reinforcing agents under the best of conditions only to a minor extent. However, when one combines nucleating agents with the non-metallic magnetic sweeping agents as shown in Examples 31 through 34, in the presence of a magnetic field, the improvements obtained are pronounced.

In addition to the foregoing, it has been found that the properties are strongly directional. The properties listed in Table 6 are parallel not only to the direction of application of the magnetic field, but also parallel to the direction of molding. The notch resistance under these conditions is increased when measured at right angles to the direction of the magnetic field in the direction of molding over that obtained from a non-nucleated, non-swept similar raw material such as defined in Example 26. In addition, both tensile strength at right angles to the direction of molding is reduced generally by a factor of 10 to 25 percent whereas elongation is increased by a factor of 20 to 50 percent, thus establishing the strongly directional aspects imposed by the nature of combinations and conditions defined for Examples 31 through 34.

Examples 35 through 44 are given in Table 7 and define the effect of various fibrous reinforcing agents under various conditions, these conditions being the absence of nucleating agents without a magnetic field, the presence of nucleating agents in the presence of a magnetic field and in combination with the Table 2 class of sweeping agents, the presence of nucleating agents combined with Table 2 class of sweeping agents, plus brass plated wire in the alpha ferrite condition with or without the presence of fluffed asbestos.

The data given in these tables indicate that brass plated iron wire even though present in an amount as low as approximately 2 volume percent exhibits distinct reinforcing properties and that asbestos unquestionably does. However, the most important pieces of data in this table indicates that even though the class of magnetic sweeping agents given in Table 2 are effective for improving the degree of reinforcement in the presence of nucleating agents, that much stronger sweeping agents such as the alpha iron and more effective in this regard and notable in their improvement of the strength made available by asbestos. Again, as before, the presence of the magnetic field make these physical properties highly directional. In the absence of the magnetic field the properties are roughly the same in all directions but at lower levels than those listed in Table 7, since these values are the values which are given in a direction parallel to the direction of extrusion and parallel to the direction of the application of the magnetic field. One of the more important determinations listed in this table is the effect which the presence of the highly magnetic type of sweeping agent has on the physical properties in the specimen with regard to reinforcement outside of that obtained from nucleation in a specific direction, this being the reinforcement which most evidently takes place by forcing the asbestos fibers to line up in a particular desired direction.

TABLE 7

EFFECT OF REINFORCING AGENTS UNDER VARIOUS CONDITIONS

| Example Number | Base | Additives (1)+(3) Iron Wire Weight % | Asbestos[2] Weight % | Molding at 150° F. T.S. p.s.i. | Elong. | Molding at 325° F. T.S. p.s.i. | Elong. |
|---|---|---|---|---|---|---|---|
| 35 | Ex. 29 | 10 | — | 8,700 | 200 | 10,000 | 160 |
| 36 | Ex. 30 | 10 | — | 9,800 | 250 | 12,000 | 200 |
| 37 | Ex. 31 | 10 | — | 19,500 | 160 | 29,000 | 70 |
| 38 | Ex. 29 | 10 | 10 | 9,600 | 110 | 12,000 | 140 |
| 39 | Ex. 29 | 10 | 30 | 15,400 | 40 | 26,000 | 20 |
| 40 | Ex. 30 | 10 | 10 | 12,800 | 140 | 18,000 | 80 |
| 41 | Ex. 30 | 10 | 30 | 19,800 | 110 | 29,000 | 60 |
| 42 | Ex. 31 | 10 | 10 | 24,000 | 70 | 36,000 | 30 |
| 43 | Ex. 31 | 10 | 30 | 30,000 | 50 | 42,000 | 15 |
| 44 | Ex. 29 | — | 30 | 14,200 | 80 | 24,000 | 20 |

[1]Alpha ferrite brass plated iron wire - 3/16" to ¼" length, 10 microns diameter.
[2]Fluffed asbestos - 1/16" to ¼" length.
[3]When magnetic field is applied, the flux density is 10 gauss.

The effects of magnetically oriented and swept reinforcement of polymers outside of the field of the polyalkylene terephthalates are shown in Examples 45 through 65 and summarized in Table 8. The two types of fibrous reinforcements were brass coated ferritic iron and fluffed asbestos. However, magnetic wires, stronger than ferritic iron, also brass plated can be used in the place of the ferritic iron, if desired. Again, the significant reinforcement characteristics of the brass plated ferritic iron may be seen from examination in the table, remembering again that the volume percent is less than 2 percent of the base plastic. Thermally stabilized base plastics were used throughout. The most notable effect is the combination of the magnetic metal wires and fluffed asbestos in a magnetic field in which the combination of the two yields a result superior than either of the two used alone or better than when the two are used together in combination in the absence of a magnetic field. Thus, when the mixture of the magnetic wire and the asbestos are injection molded with the respective plastic indicated in the talbe, the physical properties obtained in the absence of a magnetic field are only slightly better than that when asbestos alone is used in the absence of the magnetic wire and in the absence of the magnetic field.

Of particular interest are the examples encompassed in Nos. 61 through 65. This material is a thermoplastic elastomer and after the various types of reinforcements are applied, not only are the tensile properties improved, but the materials still exhibit elastomeric properties. In other words, if a stress is applied so as to change the dimensions of the piece, the piece returns to its original dimension once the stress is relieved. When a very high percentage of the magnetic wire is used in combination with the asbestos with the relatively weak thermoplastic elastomer given in Table 8, namely, the styrene-butadiene, a very high strength elastomer is obtained with excellent tensile strength properties and good elongation as defined in the table while still retaining elastomeric properties.

TABLE 8

EFFECT OF MAGNETIC ORIENTATION REINFORCEMENT OF VARIOUS POLYMERS

| Example Number | Polymer Type | Mixing and Injection Temperature | Mold Temperature | Additives by weight Iron Wire[2] | Asbestos[3] | Tensile Strength p.s.i. | Elong. % |
|---|---|---|---|---|---|---|---|
| 45 | ABS[1] | 450°F. | 250°F. | — | — | 7,000 | 15 |
| 46 | " | " | " | — | 20% | 16,000 | 4.0 |
| 47 | " | " | " | 10% | — | 8,000 | 15 |
| 48 | " | " | " | 10% | 20% | 21,000 | 10 |
| 49 | Nylon 6/6 | 560°F. | 250°F. | — | — | 12,000 | 60 |
| 50 | " | " | " | — | 20% | 24,000 | 3.0 |
| 51 | " | " | " | 10% | — | 13,000 | 50 |
| 52 | " | " | " | 10% | 20% | 29,000 | 30 |
| 53 | Polycarbonate | 600°F. | 250°F. | — | — | 9,000 | 120 |
| 54 | " | " | " | — | 20% | 25,000 | 2.0 |
| 55 | " | " | " | 10% | — | 11,000 | 80 |
| 56 | " | " | " | 10% | 20% | 33,000 | 60 |
| 57 | Polypropylene | 500°F. | 250°F. | — | — | 5,000 | 600 |
| 58 | " | " | " | — | 20% | 12,000 | 80 |
| 59 | " | " | " | 10% | — | 6,500 | 250 |
| 60 | " | " | " | 10% | 20% | 20,000 | 80 |
| 61 | Styrene-butadiene[4] | 375°F. | 200°F. | — | — | 2,000 | 1,000 |
| 62 | " | " | " | — | 20% | 7,000 | 50 |
| 63 | " | " | " | 10% | — | 2,800 | 800 |
| 64 | " | " | " | 10% | 20% | 12,000 | 400 |
| 65 | " | " | " | 60% | 20% | 36,000 | 80 |

[1]Acrylonitrile-butadiene-styrene
[2]Same as described in Table 7 (magnetic field, 10 gauss).
[3]Same as described in Table 7 (magnetic field, 10 gauss).
[4]Thermoplastic Elastomer.

EXAMPLE 66

Same as Example 8, except that 20 percent beta calcium ortho silicate (Larnite) of 0.5 micron average size was added as a mineral filler. In this case, a tensile strength after molding of 26,000 p.s.i. was achieved with an elongation of 30 percent.

EXAMPLE 67

Same as Example 10, except that 20 percent of Larnite of 0.5 microns average size was added yielding a tensile strength of 34,000 p.s.i. and an elongation of 5 percent.

EXAMPLE 68

Same as Example 8, except that 35 percent of 0.5 micron average size Larnite was added yielding a tensile strength of 34,000 p.s.i. and an elongation of 8 percent.

EXAMPLE 69

Same as Example 10, except that 35 percent Larnite of average particle size of 0.5 microns was added yielding a tensile strength of 42,000 p.s.i. and an elongation of 3 percent.

I claim:

1. A shaped synthetic polyalkylene terephthalate polymer article with enhanced physical properties consisting essentially of the following:
a body of liner polymer consisting of amorphous and crystalline segments and up to 50 percent by weight of a nucleating agent consisting of particles of a solid inorganic acicular silicate material distributed uniformly throughout said body and oriented in a preferred direction, said inorganic material consisting of crystals with A, B, and C-axes, the length of the C-axis of said crystals being within 10 percent of the length of the C-axis of the crystalline polymer, and the lengths of either the A or B axis of said crystals being within 20 percent of the lengths of the A or B-axis of the crystalline polymer, and the angle between the A-axis and the C-axis of said inorganic crystalline material being within 20 percent of the angle between the A-axis and the C-axis of said crystalline polymer.

2. The article of claim 1 wherein the particle size of said particles of solid inorganic material is between 0.1 and 3 microns.

3. The article of claim 1 wherein the polyalkylene terephthalate is selected from the group consisting of polyethylene terephthalate, polypropylene terephthalate, polymethyleneterephthalate and polybutylene terephthalate.

4. The article of claim 1 wherein the amount of nucleating agent is between 0.01 percent and about 5 percent by weight of the polymer.

5. The article of claim 1 wherein the particle size of the nucleating agent is 0.1 to 0.5 microns.

6. The article of claim 1 wherein the nucleating agent is an acicular inorganic silicate material capable of being aligned by magnetic forces.

7. The article of claim 1 wherein the nucleating agent is a silicate containing both ferric iron and ferrous iron.

8. The article of claim 1 wherein the polymer is a polyethylene terephthalate and the solid inorganic material is beta calcium orthosilicate.

9. The article of claim 1 additionally containing up to about 20 percent by weight of at least one magnetic non-metallic sweeping agent selected from the group consisting of oxide and phosphate compounds of Cr, Co, Fe, Mn or rare earth elements other than La, Y and Ce.

10. The article of claim 1 which has been subjected to a magnetic field of between 1 and 1000 gauss during at least a part of the molding of the article.

11. The article of claim 1 additionally containing short pieces of high permeability ferromagnetic metallic materials which act as magnetic sweeping agents during the molding of said article, or as reinforcements for said article.

12. The article of claim 9 additionally short pieces of high permeability ferromagnetic metallic materials which act as magnetic sweeping agents during the molding of said article, or as reinforcements for said article.

13. The article of claim 12 containing brass plated iron or steel wires having diameters less than about 10 microns and lengths from about 100–2000 microns said wires being oriented in the same sense as said polymer.

14. The article of claim 13 additionally containing up to 20 percent by weight of a fibrous reinforcing agent selected from the group consisting of glass fibers, asbestos fibers, wollastonite fibers and glass wool fibers.

15. The article of claim 14 wherein the reinforcing agent is amphibole asbestos.

16. The article of claim 1 shaped by injection molding.

17. The article of claim 1 which has been subjected to a heat treatment after molding.

* * * * *